(12) United States Patent
Kaizaki et al.

(10) Patent No.: US 8,054,293 B2
(45) Date of Patent: *Nov. 8, 2011

(54) ELECTRONIC APPARATUS

(75) Inventors: Keiji Kaizaki, Kadoma (JP); Tamotsu Yamamoto, Ashiya (JP)

(73) Assignee: Panasonic Corporation, Osaka (JP)

( * ) Notice: Subject to any disclaimer, the term of this patent is extended or adjusted under 35 U.S.C. 154(b) by 895 days.

This patent is subject to a terminal disclaimer.

(21) Appl. No.: 11/878,362

(22) Filed: Jul. 24, 2007

(65) Prior Publication Data

US 2008/0030473 A1 Feb. 7, 2008

Related U.S. Application Data

(62) Division of application No. 10/297,673, filed as application No. PCT/JP02/03465 on Apr. 5, 2002, now Pat. No. 7,295,187.

(30) Foreign Application Priority Data

Apr. 11, 2001 (JP) ................................. 2001-112329
Jul. 5, 2001 (JP) ................................. 2001-204349

(51) Int. Cl.
*G06F 3/033* (2006.01)

(52) U.S. Cl. .......................... 345/167; 345/163; 345/164

(58) Field of Classification Search ........... 345/163–167
See application file for complete search history.

(56) References Cited

U.S. PATENT DOCUMENTS

| 4,469,330 A | 9/1984 | Asher |
| 4,933,670 A | 6/1990 | Wislocki |
| 5,171,978 A | 12/1992 | Mimlitch et al. |
| 5,248,961 A * | 9/1993 | Fujii ............................. 345/167 |
| 5,345,253 A | 9/1994 | Chang |
| 5,438,480 A | 8/1995 | Yamashita |
| 5,757,616 A | 5/1998 | May et al. |
| 6,144,369 A | 11/2000 | Shiga |
| 6,147,679 A | 11/2000 | Numata et al. |
| 6,225,980 B1 | 5/2001 | Weiss et al. |
| 6,501,458 B2 | 12/2002 | Baker et al. |
| 6,791,534 B2 | 9/2004 | Tada et al. |
| 6,809,722 B2 | 10/2004 | Mei et al. |

FOREIGN PATENT DOCUMENTS

| CN | 1181549 A | 5/1998 |
| EP | 0 987 616 A2 | 5/1999 |
| JP | 59-23420 | 2/1984 |
| JP | 60-151740 | 8/1985 |
| JP | 2-73236 | 6/1990 |
| JP | 2-240716 | 9/1990 |

(Continued)

*Primary Examiner* — Bipin Shalwala
*Assistant Examiner* — Steven Holton
(74) *Attorney, Agent, or Firm* — McDermott Will & Emery LLP

(57) ABSTRACT

An electronic apparatus disclosed facilitates the replacement of an input device. In the electronic apparatus equipped with the input device allowing various input operations, the input device including first signal generators is positioned by being placed in an opening of a housing from the outside. A cover can be detached from the housing and fixes the input device when installed in the opening of the housing. Second signal generators are provided inside the housing and function in combination with the respective first signal generators. Just mounting the cover to the housing fixes the input device. This facilitates the replacement of the input device, eliminating the need to open the housing and to remove a wiring board mounted with the second signal generators in replacement of the input device.

9 Claims, 14 Drawing Sheets

FOREIGN PATENT DOCUMENTS

| | | |
|---|---|---|
| JP | 02240716 A | 9/1990 |
| JP | 6-35599 | 2/1994 |
| JP | 6-81034 | 11/1994 |
| JP | 11-161414 | 6/1999 |
| JP | 11-167464 | 6/1999 |
| JP | 11-327775 | 11/1999 |

* cited by examiner

FIG. 1
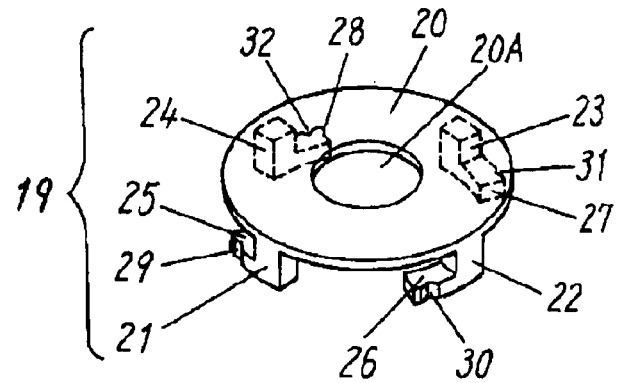
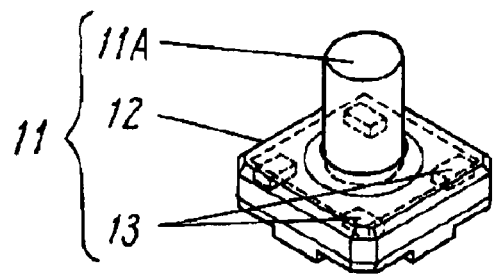
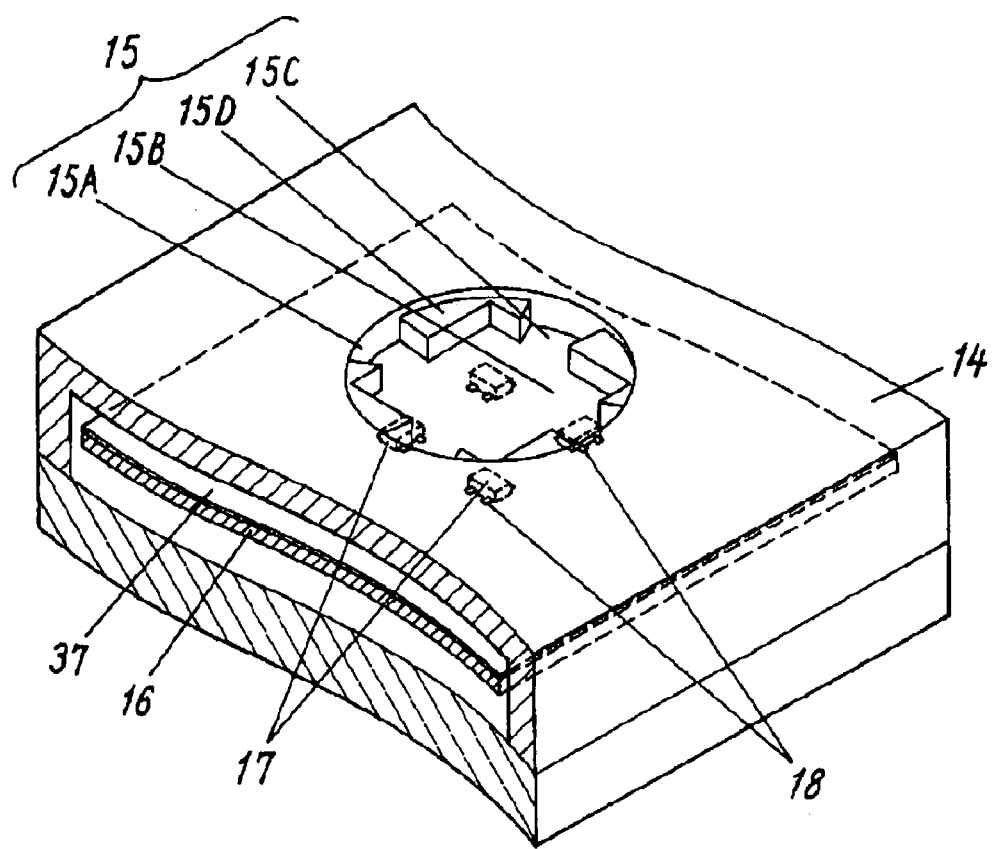

FIG. 3
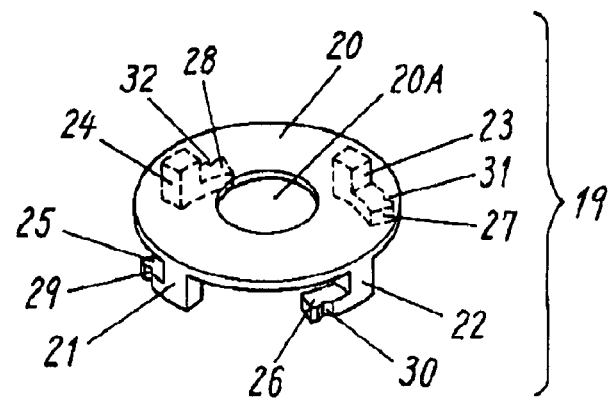
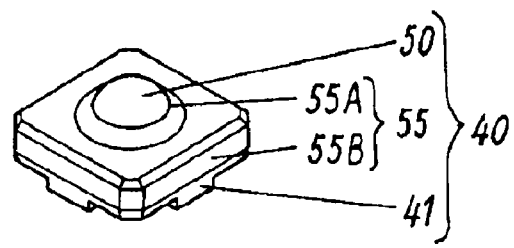
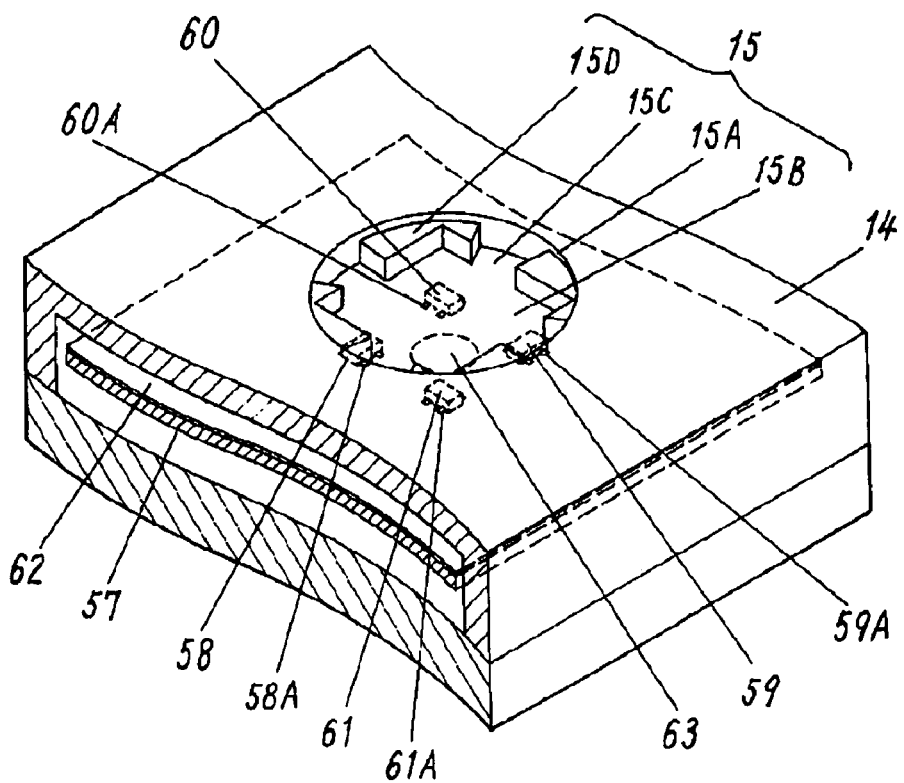

ELECTRONIC APPARATUS

This application is a Divisional of U.S. application Ser. No. 10/297,673, filed Dec. 9, 2002 now U.S. Pat. No. 7,295,187, which in turn is a National Phase application of PCT/JP02/03465, filed Apr. 5, 2002, published as WO 02/084474 A1, claiming priority of Japanese Application Nos. 2001-112329, filed Apr. 11, 2001, and 2001-204349, filed Jul. 5, 2001. The entire contents of each of which are hereby incorporated by reference.

TECHNICAL FIELD

The present invention relates to an electronic apparatus equipped with an input device enabling various inputs when an operating member undergoes required operation.

BACKGROUND ART

Recently, electronic apparatuses equipped with various input devices have come into widespread use. One of such conventional electronic apparatuses will be described hereinafter with reference to FIG. 14.

FIG. 14 is a perspective view of an essential part of the conventional electronic apparatus.

As shown in this drawing, terminal 2 of input device 1 is electrically and mechanically connected in place to wiring board 3 of the electronic apparatus by soldering, whereby input device 1 is mounted to wiring board 3.

This input device 1 includes operating member 4 projecting upward. When an operator moves operating member 4 in a specified direction with a hand or a finger, input device 1 outputs an electric signal corresponding to this operation.

This electric signal is sent from terminal 2 of input device 1 to a microcomputer (not shown) or the like of the electronic apparatus via wiring board 3, and consequently, the electronic apparatus starts a specific function corresponding to this signal.

A top side of housing 5 serving as an upper case of the electronic apparatus has opening 5A permitting the passage of operating member 4 of input device 1. Through this opening 5A, only operating member 4 projects on the top side of housing 5.

A variety of functions of the thus-configured conventional electronic apparatus equipped with input device 1 can be started by manipulating operating member 4 of input device 1 that projects upward from housing 5 or is exposed over housing 5.

Failed input device 1 of the conventional electronic apparatus described above is replaced in the following manner.

Housing 5 of the electronic apparatus is opened, and wiring board 3 is removed. Subsequently, failed input device 1 is removed by detaching soldered terminal 2 of input device 1 from wiring board 3. Thereafter, a new input device is mounted to wiring board 3, and the electronic apparatus is reassembled. The replacement is thus extremely troublesome.

DISCLOSURE OF THE INVENTION

An electronic apparatus of the present invention includes an input device, a housing, a cover, and a second signal generator.

The input device includes a first signal generator. The housing includes an opening in which the input device is placed externally and positioned. The cover can be detached from the housing and fixes the input device when installed in the opening of the housing. The second signal generator is provided inside the housing and functions in combination with the first signal generator.

The input device installed in this electronic apparatus can be removed by just detaching the cover from the housing. Thereafter, placing a new input device in the opening and reinstalling the cover on the housing are all that is needed to allow the new input device to function electrically and mechanically. The replacement of the input device is thus easy, eliminating the need to open the housing and to electrically reconnect the second signal generator provided inside the housing.

BRIEF DESCRIPTION OF THE DRAWINGS

FIG. 1 is an exploded perspective view of an electronic apparatus in accordance with a first exemplary embodiment of the present invention.

FIG. 3 is an exploded perspective view of an electronic apparatus in accordance with a second exemplary embodiment of the present invention.

DESCRIPTION OF THE PREFERRED EMBODIMENTS

Exemplary embodiments of the present invention will be demonstrated hereinafter with reference to the accompanying drawings.

Exemplary Embodiment 1

FIG. 1 is an exploded perspective view of an electronic apparatus in accordance with the first exemplary embodiment of the present invention.

Figure 2:
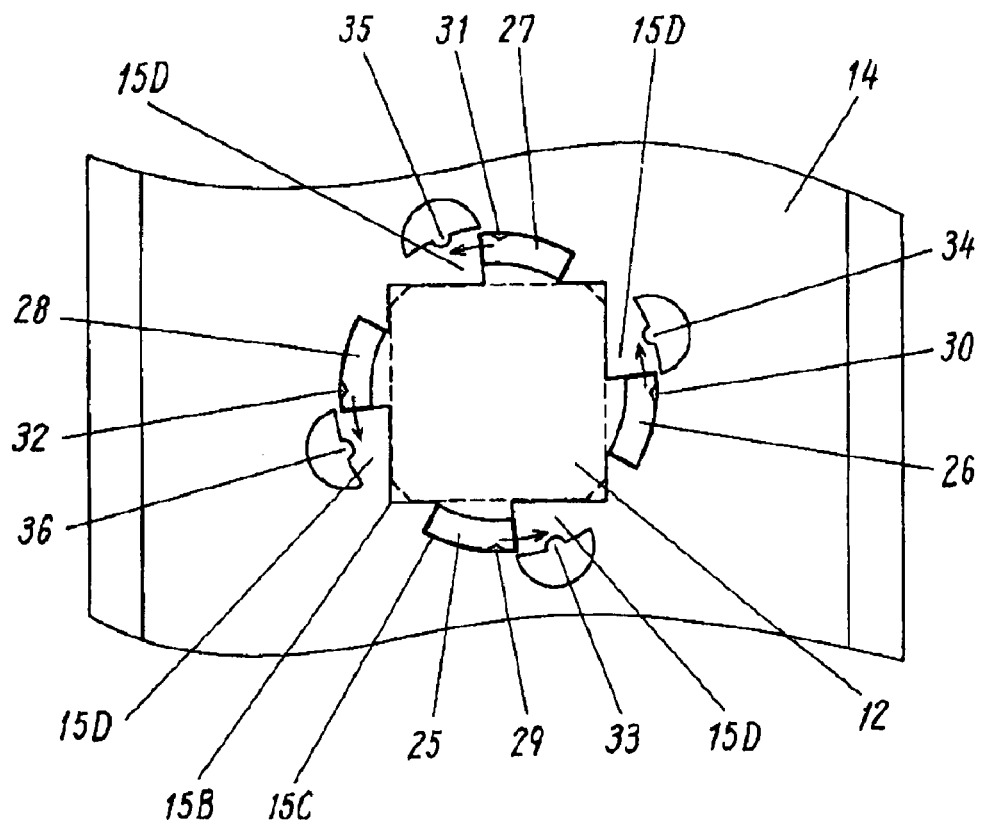
FIG. 2 is a conceptual illustration of a housing seen from inside the housing when a cover, which is an essential element in the first embodiment, is mounted.

FIG. 2 illustrates a housing seen from inside the housing when a cover, which is an essential element of the electronic apparatus, is mounted.

As shown in the drawings, substantially square input device 11 is constructed of component case 12 made of resin, first signal generators 13 provided inside case 12, and operating member 11A, and is installed in housing 14 of the electronic apparatus.

Housing 14 is provided with locating opening 15 large enough to receive case 12 of input device 11.

This opening 15 is a combination of circular opening 15A provided in a top side of housing 14 and having a larger diameter than component case 12 in size, square opening 15B concentric with circular opening 15A positioned above square opening 15B and matching up with case 12 in shape, and four retaining openings 15C each protruding outward from the middle of each side of square opening 15B.

In regard to combination with cover 19 (described later), retaining openings 15C are preferably formed so that a circular arc connecting respective outer peripheries of four retaining openings 15C will be similar in shape to circular opening 15A and will equal or will be smaller than opening 15A in size.

By having square opening 15B and retaining openings 15C, opening 15 defines projections for housing 14. These projections referred to as stepped parts 15D are flat, have the same height and are positioned below the top side of housing 14.

Housing 14 accommodates internal members including wiring board 16.

Second signal generators 17 are arranged on wiring board 16. Each one of these generators 17 produces a specified output by functioning in combination with corresponding first signal generator 13 provided inside input device 11.

Second signal generator 17 has terminal 18, which is soldered to wiring board 16.

Cover 19 with which circular opening 15A is closed has a smaller diameter than circular opening 15A and is constructed of ring-shaped flat plate 20 having through hole 20A in the middle thereof, and four L-shaped poles 21-24 projecting downward from an outer border of a bottom surface of flat plate 20. L-shaped poles 21-24 have respective horizontal parts 25-28 not connecting with flat plate 20, and these horizontal parts 25-28 have respective grooves 29-30 in their respective outer sides.

L-shaped poles 21-24 are provided at an equal angular pitch at a bottom side of cover 19, and horizontal parts 25-28 have respective leading ends oriented in the same direction.

Each one of horizontal parts 25-28 is shorter than each retaining opening 15C of opening 15.

After input device 11 is fit and positioned in square opening 15B of opening 15 of housing 14, cover 19 is placed in such a manner that L-shaped poles 21-24 are inserted into respective retaining openings 15C. Cover 19 is thereafter turned clockwise with the bottom surface of ring-shaped flat plate 20 urged against stepped parts 15D, whereby each one of horizontal parts 25-28 of poles 21-24 of cover 19 hitches on a bottom surface of corresponding stepped part 15D. Cover 19 is thus mounted to housing 14, thereby fixing input device 11.

When cover 19 is turned clockwise, grooves 29-32 formed in the respective outer sides of L-shaped poles 21-24 of cover 19 engage with respective projections 33-36 provided inside housing 14. This prevents cover 19 from easily coming off when counterclockwise external force acts on cover 19.

It is visually preferable that the thickness of flat plate 20 is equal to the depth of circular opening 15A so that a top surface of cover 19 will be flush with the top side of housing 14 when cover 19 is secured by housing 14.

When cover 19 is secured by housing 14, input device 11 is fixed without fail because input device 11 is sandwiched vertically between wiring board 16 and cover 19 with its component case 12 fitting in square opening 15B.

According to the present embodiment described above, just installing cover 19 to housing 14 facilitates the installation of input device 11.

An operation of the electronic apparatus thus mounted with input device 11 will be described hereinafter.

When operating member 11A of input device 11 is operated with a hand, a finger or the like, first signal generator 13 operates in synchronization with the movement of operating member 11A. Here, a signal is produced and transmitted to corresponding second signal generator 17 disposed on wiring board 16. This second signal generator 17 then sends a specified output from its terminal 18 to an electronic device such as a microcomputer (not shown) via wiring board 16, and consequently, the electronic apparatus starts a specific function corresponding to the signal.

When the operation of operating member 11A of input device 11 is stopped, first and second signal generators 13, 17 stop their respective operations and return to a state in which no output signal is generated.

Input device 11 is replaced in the following manner. First, cover 19 is turned counterclockwise with force great enough to disengage grooves 29-32 of L-shaped poles 21-24 from respective projections 33-36 until each one of horizontal parts 25-28 of poles 21-24 that is hitched on the bottom surface of stepped part 15D of housing 14 returns to corresponding retaining opening 15C. Cover 19 is then lifted off from housing 14.

Next, input device 11 positioned in square opening 15B of housing 14 is removed, and new input device 11 is then placed in opening 15B. Thereafter, cover 19 is reinserted in opening 15 of housing 14 and turned clockwise to hitch each one of horizontal parts 25-28 of its poles 21-24 on the bottom surface of each stepped part 15D and to engage grooves 29-32 formed in the respective outer sides of horizontal parts 25-28 with respective projections 33-36. Consequently, new input device 11 is fixed by stepped parts 15D of housing 14, wiring board 16 and cover 19.

In a typical electronic apparatus, input device 11 having a mechanically movable part such as operating member 11A is well known for its high frequency of failure. Input device 11 of the present invention is superior in maintenance because as described above, device 11 can be replaced with ease when failed.

In cases where input device 11 has failed, repair is simply a matter of replacing device 11 in the simple manner described above, so that there is no need to troublesomely solder first signal generators 13 of input device 11, second signal generators 17 and others to wiring board 16 and to detach them from board 16.

Cover 19 may be fixed to housing 14 by snap fitting or screwing instead of turning the one having L-shaped poles 21-24 such as described above.

For relative ease of alignment between each first signal generator 13 and each corresponding second signal generator 17, for example, in replacement of input device 11, it is preferable that first signal generator 13 of input device 11 and second signal generator 17 disposed on wiring board 16 function in noncontact combination, using, for example, magnetism or light.

For example, a magnet is used as first signal generator 13 of input device 11, while a magnetic sensor such as a Hall device is used as second signal generator 17 inside housing 14. In this case, first and second signal generators 13, 17 function in noncontact relation, and a specified output is obtained from second signal generator 17.

In the above case, water-proof insulating sheet 37 can be disposed between first signal generators 13 of input device 11 and second signal generators 17 of housing 14 for protection from dust or water entering from opening 15 in which input device 11 is placed, input device 11 per se or others. Consequently, the electronic apparatus can have a dustproof and waterproof structure.

Instead of having insulating sheet 37, the electronic apparatus may have a wall, provided in the form of a box-shaped recessed part to cover the periphery and bottom of opening 15 of housing 14, as a waterproof construction.

By using a light-emitting device such as a LED or an EL device, for example, at wiring board 16 provided with second signal generators 17 inside housing 14 and using light-transmitting material for cover 19 to allow cover 19 to guide light emitted by the light-emitting device to the top side of housing 14, the periphery of input device 11 can be illuminated with this light. This improves visibility of the position of input device 11 and allows favorable operation, for example, even at night.

Not only cover 19 but also component case 12 of input device 11 may be made of light-transmitting material to guide the light emitted by the light-emitting device.

As described above, the present embodiment facilitates the replacement of input device 11 which can be removed by just detaching cover 19 from housing 14 without removing housing 14 from the electronic apparatus.

The present invention is applicable to cases where a stick, a pad, a rolling member or the like is mounted as operating member 11A of input device 11, and each first signal generator 13 operates in accordance with the operation of such operating member 11A.

Exemplary Embodiment 2

The second exemplary embodiment of the present invention will be described hereinafter.

In the present embodiment, a trackball device capable of detecting operation and a signal through use of magnetism is mounted in an electronic apparatus in place of input device 11 such as described in the first exemplary embodiment. Elements similar to those in the first embodiment have the same reference marks and will not described in detail.

Figure 4:
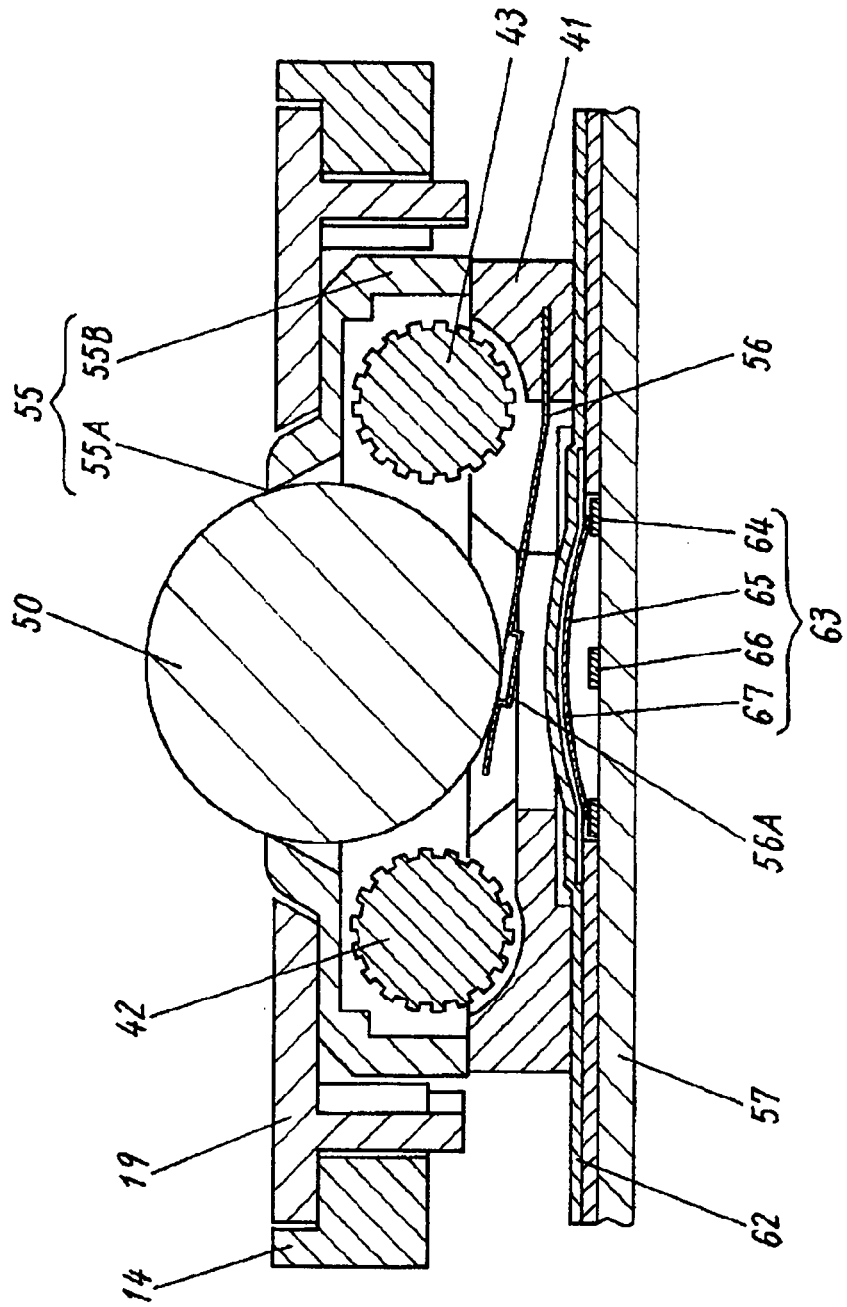
FIG. 4 is a sectional view of the electronic apparatus of FIG. 3.
Figure 5:
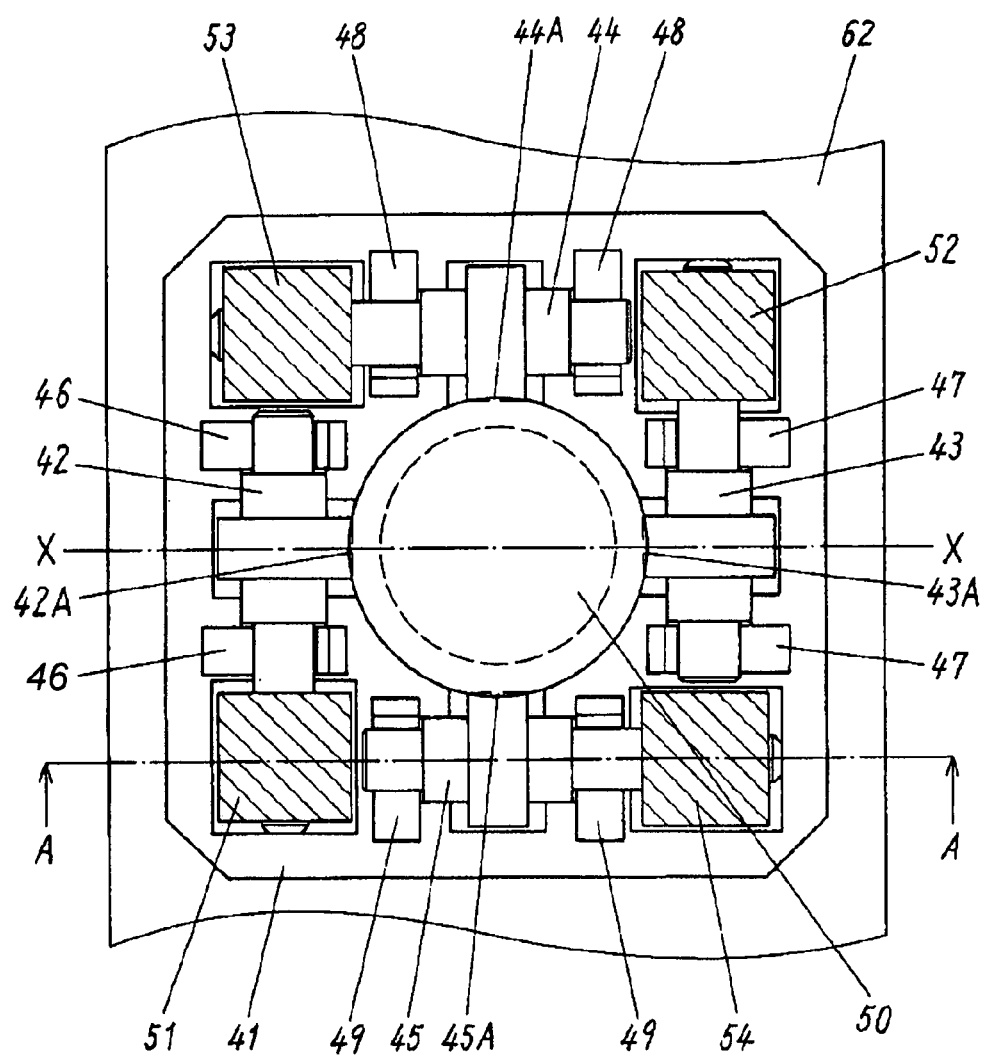
FIG. 5 is a top plan view of the electronic apparatus of FIG. 3 from which a housing and a case of a trackball device are omitted.
Figure 6:
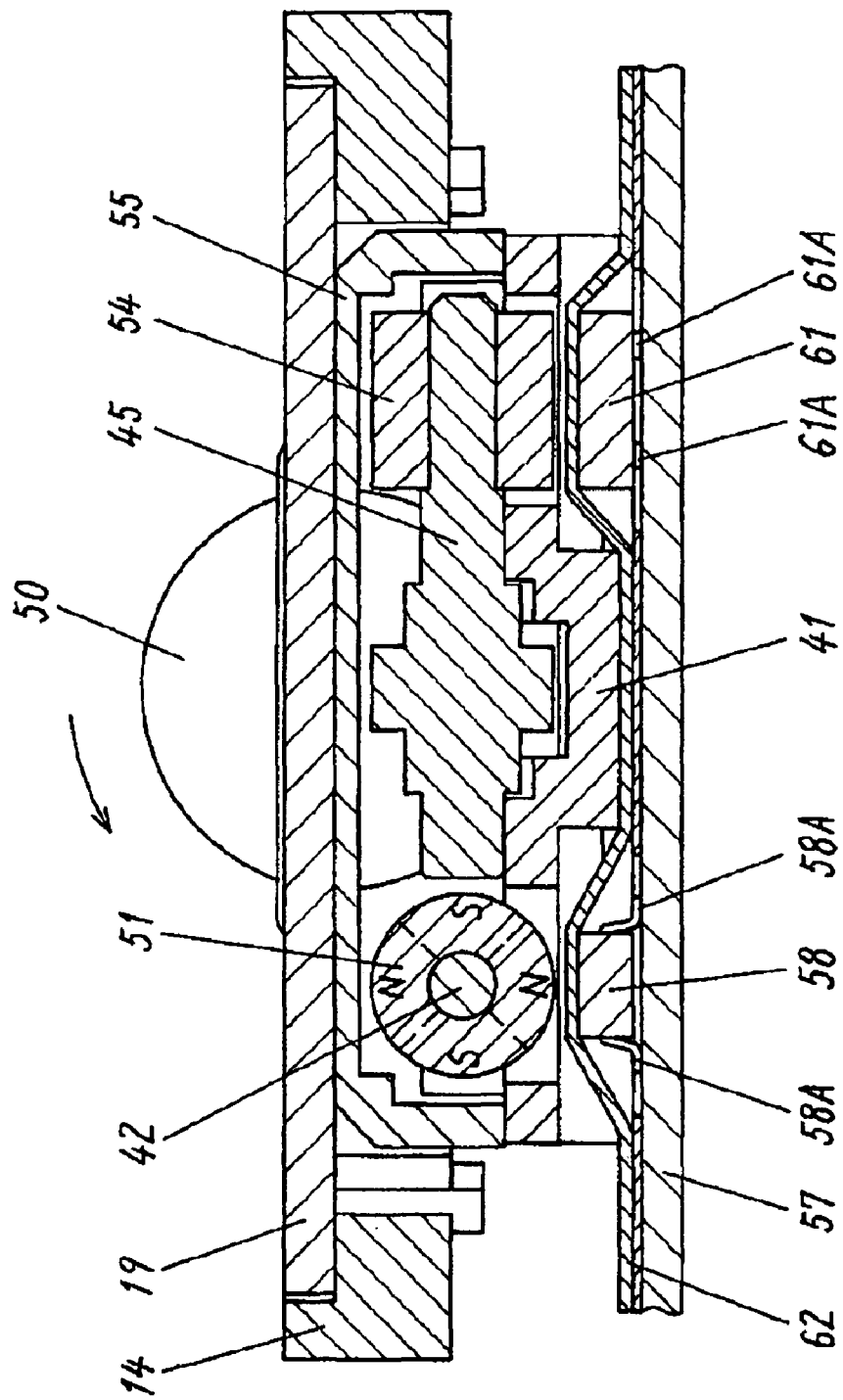
FIG. 6 is a sectional view taken along line A-A of FIG. 5.
Figure 7:
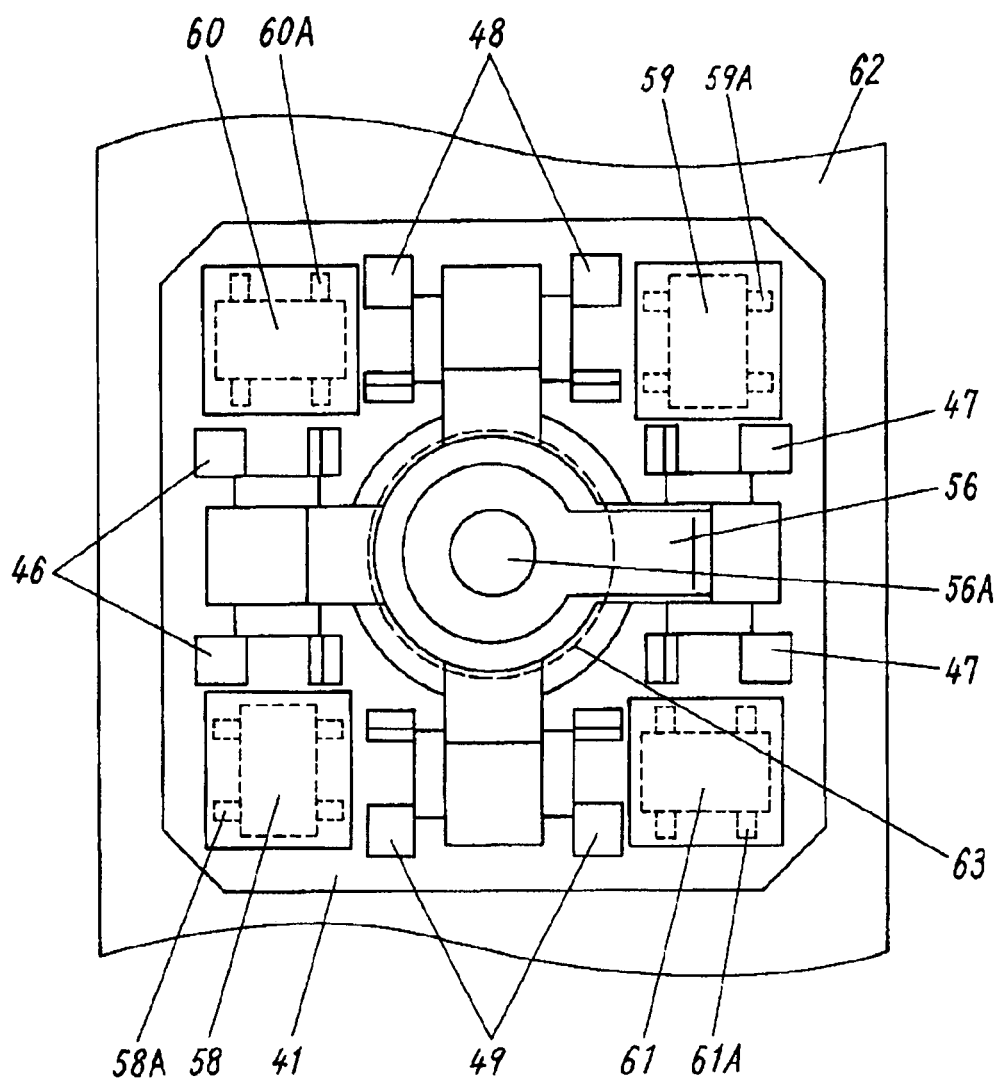
FIG. 7 is a top plan view of the electronic apparatus of FIG. 3 from which the housing, the case of the trackball device, a ball and rollers are omitted.

FIGS. 3 and 4 are an exploded perspective view and a sectional view, respectively, of the electronic apparatus in accordance with the second embodiment of the present invention. FIG. 5 is a top plan view of the same electronic apparatus from which a housing, and a case of the trackball device are omitted, and FIG. 6 is a sectional view taken along line A-A of FIG. 5. FIG. 7 is a top plan view of the same electronic apparatus from which the housing, the case of the trackball device, a ball, rollers and others are omitted.

As shown in these drawings, the electronic apparatus of the present embodiment has trackball device 40 placed in opening 15 of housing 14 as input device 11. Cover 19 is mounted and fixed to housing 14 from the upper side, so that trackball device 40 is positioned.

First, a description will be provided of this trackball device 40.

As shown in FIGS. 4 and 5, XI roller 42 and XII roller 43 are disposed in opposed relation, and YI roller 44 and YII roller 45 are disposed in opposed relation. These rollers 42-45 each have the shape of a round shaft and are arranged in a square configuration in the vicinity of respective sides of a top surface of square base 41 molded out of resin, so that one pair of rollers is orthogonal to the other pair of rollers. Supports 46-49 formed integrally with base 41 rotatably support rollers 42-45, respectively.

Contact parts 42A, 43A, 44A, 45A provided at respective middle parts of XI roller 42, XII roller 43, YI roller 44 and YII roller 45 are in respective positions slightly lower than a center of ball (operating member) 50 of trackball device 40 and are positioned around ball 50 to each face ball 50 across an established clearance.

Respective contact parts 42A-45A of XI roller 42 to YII roller 45 are circular in section and have specific recessed and projected parts in respective equally divided positions in circumference.

As shown in FIGS. 5 and 6, rollers 42-45 have, at their respective ends, magnets (first signal generators) 51-54 each magnetized with north and south poles alternating every 90°. These magnets 51-54 rotate in synchronization with respective rotating rollers 42-45.

As shown in FIGS. 3 and 4, case 55 of trackball device 40 is fixed on base 41 to form a component case in cooperation with base 41. This case 55 is made of resin and has circular hole 55A in the center of its top surface and peripheral wall 55B extending downward from an outer edge of its top surface. Circular hole 55A has a smaller diameter than ball 50 to allow an upper portion of ball 50 stored in case 55 to project, and a lower edge of peripheral wall 55B is fixed to base 41. Thus, trackball device 40 does not let go of ball 50 under normal conditions.

As shown in FIG. 4, ball 50 is pushed from beneath by one end of resilient cantilever plate spring 56, the other end of which is fixed into base 41 by insert molding or the like. When ball 50 is in such a normal condition as not to be operated, circular hole 55A in the center of the top surface of case 55 is closed by the upper end portion of ball 50.

Ball 50 is vertically movable in a space defined by case 55 and base 41 since a lower end portion of ball 50 pushes plate spring 56 down when downward pressing force is applied to ball 50.

After trackball device 40 thus configured is placed in opening 15 of housing 14 as described earlier, cover 19 is mounted. Consequently, the component case (a combination of base 41 and case 55) is restricted sideways by a sidewall of each stepped part 15D of housing 14 and sandwiched vertically between wiring board 57 disposed inside housing 14 and cover 19, thereby being fixedly installed in the electronic apparatus.

As shown in FIG. 6, magnetic sensors 58-61 are disposed on wiring board 57 inside housing 14 with their respective terminals 58A-61A soldered to wiring board 57. These magnetic sensors 58-61 are second signal generators functioning in combination with respective magnets (first signal generators) 51-54 of trackball device 40 to output specified signals.

Magnetic sensors 58-61 are provided in respective positions corresponding to respective magnets 51-54 attached to respective rollers 42-45 of trackball device 40.

These sensors 58-61 and a top side of wiring board 57 are collectively covered with flexible insulating sheet 62.

A central part of a configuration of magnetic sensors 58-61 arranged on wiring board 57 corresponds to the position of the lower end portion of ball 50 of trackball device 40. Wiring board 57 is formed with, at this central part, self-restoring push switch 63.

This self-restoring push switch 63 includes outer fixed contact 64 formed of metallic foil or the like on wiring board 57, domelike movable contact 65 formed of a convex, resilient metal sheet, and central fixed contact 66 provided on wiring board 57 below a central portion of movable contact 65. Movable contact 65 and central fixed contact 66 face each other across an established space, and a top surface of movable contact 65 is covered with flexible insulating film 67 having an adhesive layer on its bottom surface.

Push switch 63 having the above-described structure is low-profile and can be constructed at low cost. This push switch 63 also has high performance because switch 63 restores itself and has a click feel in operation.

Domelike movable contact 65 has resilient restitutive force set equal to or greater than specified resilient restitutive force so as not to be turned inside out by being pressed by ball 50 when ball 50 is in normal condition or in rolling operation.

It is not necessary for wiring board 57 to be formed with self-restoring push switch 63. Switch 63 may be mounted to wiring board 57 as a completed low-profile single push switch.

Figure 8:
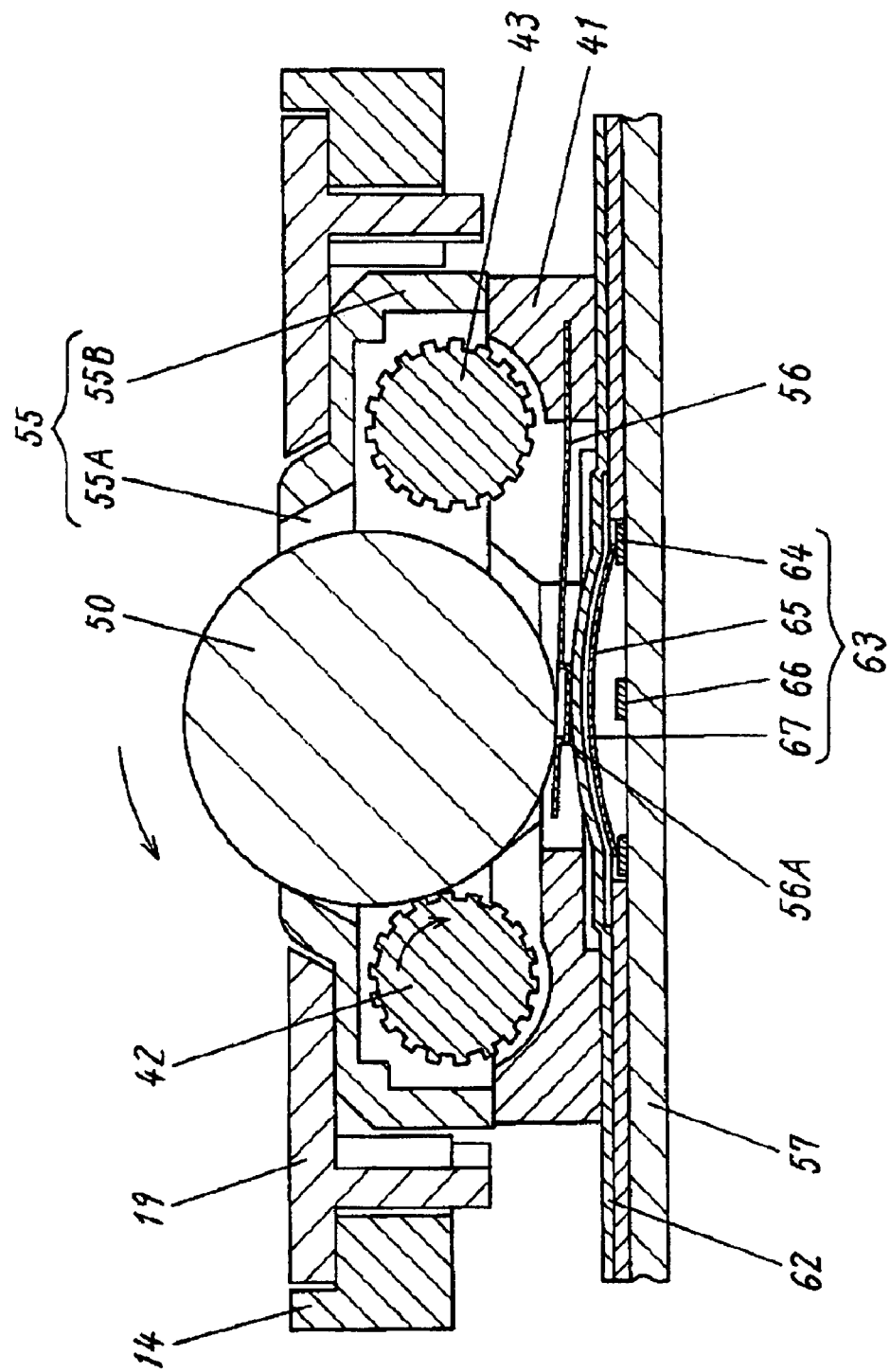
FIG. 8 is a sectional view taken along line X-X of FIG. 5, illustrating the trackball device in rolling operation.
Figure 9:
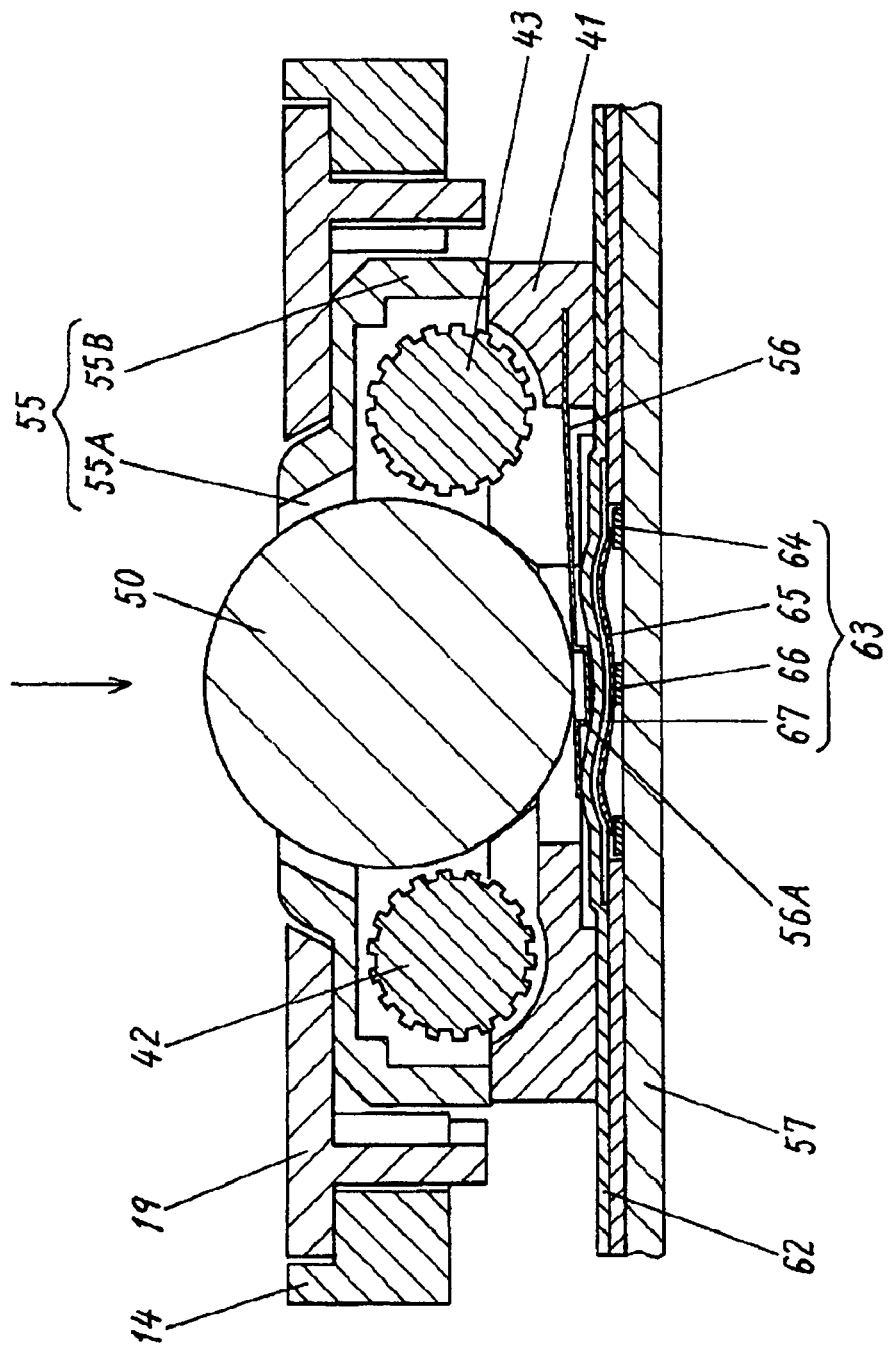
FIG. 9 is a sectional view taken along line X-X of FIG. 5, illustrating the trackball device in pressing operation.

Referring to FIGS. 8 and 9, a description will be provided next of an operation of the electronic apparatus in accordance with the present embodiment.

FIG. 8 is a sectional view taken along line X-X of FIG. 5, illustrating ball 50 of the trackball device in rolling operation, and FIG. 9 is a sectional view illustrating ball 50 in pressing operation.

First, a description will be provided of a leftward rolling operation of ball 50 that follows the normal condition illustrated by FIGS. 4 and 6 in which trackball device (input device) 40 of the electronic apparatus of this embodiment is not in operation. The leftward rolling operation is rolling of ball 50 leftward, that is, in a direction indicated by an arrow of each one of FIGS. 6 and 8 with a hand or a finger touching the upper portion of ball (operating member) 50 projecting upward through circular hole 55A of case 55 of trackball device 40.

When rolled leftward, ball 50 contacts only contact part 42A of XI roller 42 positioned in the direction of the operation, or ball 50 contacts contact part 42A of XI roller 42 and either contact part 44A of YI roller 44 or contact part 45A of YII roller 45 at the same time.

Here, ball 50 rotates while contacting the recessed and projected parts provided at contact part 42A of XI roller 42, which is positioned in the direction of the operation, at right angles, thereby generating frictional force great enough to rotate XI roller 42, and consequently, XI roller rotates.

Even when ball 50 comes into contact with either contact part 44A of YI roller 44 or contact part 45A of YII roller 45 that is disposed along a direction orthogonal to the direction of the operation, ball 50 contacts the recessed and projected parts of contact part 44A or 45A in a substantially horizontal direction, so that any one of YI roller 44 and YII roller 45 is not provided with enough frictional force for rotation. Consequently, ball 50 runs idle, and YI roller 44 and YII roller 45 do not rotate.

As XI roller 42 rotates, magnet (first signal generator) 51 provided at the end of roller 42 rotates accordingly, and the north and south poles of magnet 51 alternately and repeatedly approach corresponding magnetic sensor (second signal generator) 58 disposed below magnet 51 on wiring board 57.

As the north pole of magnet 51 approaches magnetic sensor 58, magnetism of the north pole that acts on magnetic sensor 58 increases accordingly, and sensor 58 produces a larger positive output voltage accordingly.

As the south pole approaches sensor 58, magnetism of the south pole that acts on sensor 58 increases accordingly, and sensor 58 produces a larger negative output voltage accordingly.

In other words, when the output voltage from terminal 58A of magnetic sensor 58 exceeds a specified value, an ON state is established, and an OFF state is established when the output voltage is at or below the specified value. A corresponding signal is processed by a microcomputer (not shown) or the like for generation of a digital signal.

This allows determination of the number of revolutions of XI roller 42, and based on the number of revolutions, the amount of movement of a cursor or the like, which is displayed on a display screen of the electronic apparatus, in a positive or negative direction on the x-axis is determined.

When ball 50 is rolled rightward, XI roller 42 does not rotate, but XII roller 43 rotates, and the amount of movement of the cursor, displayed on the screen, in a direction opposite to the above-mentioned leftward rolling operation on the x-axis is determined. When ball 50 is rolled forward or backward in the drawing, XI roller 42 and XII roller 43 do not rotate, but opposed YI roller 44 and YII roller 45 rotate, and the amount of movement in a positive or negative direction on the y-axis is determined.

When ball 50 is rolled diagonally in the drawing, one of XI roller 42 and XII roller 43 and one of YI roller 44 and YII roller 45 rotate, and the amount of movement of the cursor in the specified direction defined by the x- and y-axes is determined based on the rolling direction and components of ball 50.

In the above description, magnets 51-54 of XI roller 42 to YII roller 45 of trackball device 40 are each magnetized with the north and south poles alternating every 90°. This means that the signal is produced twice during one rotation of each one of rollers 42-45. However, the number of times the signal is produced may be increased or decreased on as a needed basis.

When the upper portion of ball 50 is pressed with the finger or the like in the normal condition (illustrated by FIG. 4) after the arrival of the cursor in a desired position on the display screen through the rolling operation of ball 50, ball 50 pushes down plate spring 56, disposed below ball 50, as shown in FIG. 9. Consequently, projection 56A of plate spring 56 presses, at its bottom surface, a central portion of the top part of push switch 63, that is, the central portion of domelike movable contact 65 downward via insulating sheet 62.

When this downward pressing force exceeds a specified value, domelike movable contact 65 is resiliently turned inside out with the click feel. Here, a bottom surface of the central portion of movable contact 65 contacts central fixed contact 66 as shown in FIG. 9, whereby conduction is established between outer and central fixed contacts 64, 66 through movable contact 65.

Here, a signal is transmitted as a signal identifying the position of the cursor on the display screen to a circuit of the electronic apparatus mounted with trackball device 40 through a circuit (not shown) on wiring board 57.

When the downward pressing force applied to ball 50 is released, domelike movable contact 65 restores its original domelike shape by its own resilient restoring force and pushes ball 50 back from beneath insulating sheet 62 and projection 56A of plate spring 56. Consequently, outer and central fixed contacts 64, 66 of push switch 63 are electrically disconnected from each other.

In addition, ball 50 is pushed up until it is urged against circular hole 55A of case 55 by the restoring force of cantilever plate spring 56, thus returning to the normal condition illustrated by FIG. 4.

Insulating sheet 62 may have a domelike portion corresponding to push switch 63 to function in place of plate spring 56. In this case, the domelike portion urges ball 50 upward by contacting the lower end portion of ball 50, thereby closing circular hole 55A of case 55.

According to the present embodiment described above, the cursor displayed on the screen can be moved easily with high definition through the rolling operation of ball 50, and the signal identifying the position of the cursor can be produced by operating push switch 63, positioned below ball 50, through the pressing operation of ball 50. The obtained electronic apparatus equipped with the push switch and the trackball device thus operates stably and allows a small projected area.

Even this embodiment eliminates the need to open housing 14 for removal of wiring board 57, thereby facilitating the replacement of trackball device 40 when, for example, a structurally operating part of trackball device 40 has failed. The present embodiment is also similar to the first embodiment in that the electronic apparatus has a dustproof and waterproof structure since magnetic sensors 58-61 and the top side of wiring board 57 are collectively covered with waterproof insulating sheet 62.

Exemplary Embodiment 3

The third exemplary embodiment of the present invention will be described hereinafter.

As in the case with the electronic apparatus of the second exemplary embodiment, an electronic apparatus of the present embodiment is equipped with magnetic trackball device 40 as an input device. In this embodiment, second signal generators differ from those of the second embodiment, and the description deals mainly with these second signal generators.

Elements (e.g., elements of trackball device 40) similar to those in the first and second embodiments have the same reference marks and will not be described in detail.

Figure 10:
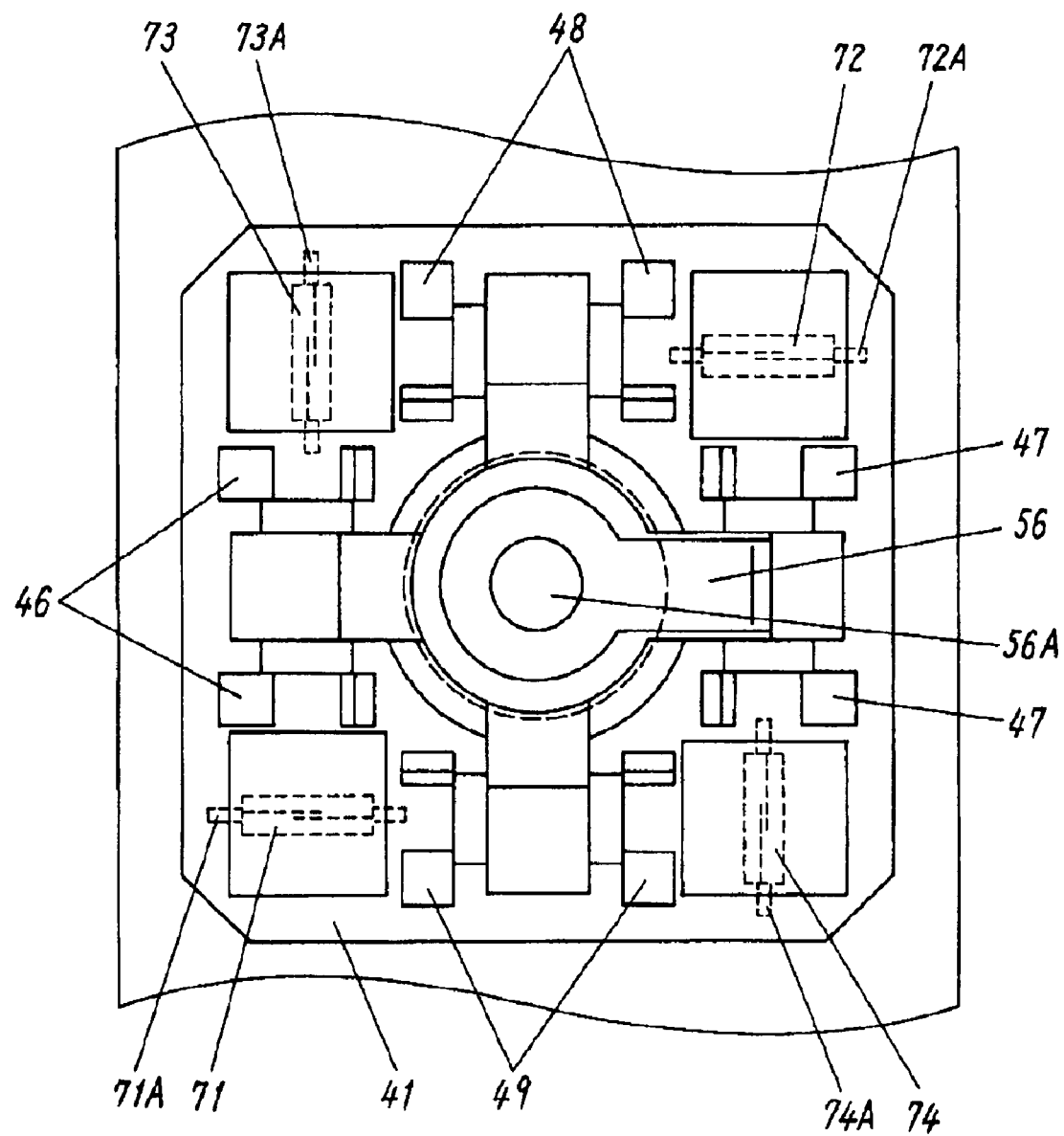
FIG. 10 is a top plan view of an electronic apparatus, from which a housing, a case of a trackball device, a ball and rollers are omitted, in accordance with a third exemplary embodiment of the present invention.

FIG. 10 is a top plan view of the electronic apparatus, from which a housing, a case of the trackball device, a ball and rollers are omitted, in accordance with the third embodiment of the present invention.

As shown in this drawing, the present embodiment differs structurally from the second embodiment illustrated by FIG. 7 in that the second signal generators mounted on wiring board 57 are four reed switches 71-74.

These four reed switches 71-74 are disposed on wiring board 57 of the electronic apparatus with their respective terminals 71A-74A soldered to board 57. As in the case of the second embodiment, these second signal generators are provided in respective positions corresponding to respective magnets (first signal generators) 51-54 (not shown in FIG. 10) attached to respective XI roller 42 to YII roller 45 (not shown in FIG. 10) rotatably supported by base 41.

As north and south poles of magnets 51-54 mounted to respective rollers 42-45 change their positions relative to each other through rotations of rollers 42-45, reed switches 71-74 repeatedly switch back and forth between ON and OFF accordingly. In this way, reed switches 71-74 output digital signals.

Except for the reed switches, the structure of the present embodiment is similar to that of the second embodiment and will not be described.

Next, a description will be provided of an operation of the thus-configured electronic apparatus in accordance with the present embodiment.

When ball 50 of trackball device 40 is rolled leftward, XI roller 42 positioned in the rolling direction of ball 50 rotates as in the case of the second embodiment. Accordingly, magnet (first signal generator) 51 rotates, and its north and south poles alternately and repeatedly approach corresponding reed switch (second signal generator) 71 as in the case of the second embodiment.

When the north pole or the south pole of magnet 51 are in a specified region with respect to reed switch 71, reed switch 71 is in the ON state, and switch 71 changes to the OFF state when the north and south poles deviate from the specified region. Reed switch 71 thus produces the digital signal corresponding to the rotation of magnet 51.

In this way, the number of revolutions of roller 42, that is, the amount of movement of a cursor, displayed on a display screen of the electronic apparatus including trackball device 40, in the specified direction is determined. This is similar to the case of the second embodiment.

Even in cases where ball 50 is rolled in a different direction, a similar operation takes place, and the reed switch corresponding to the direction of the operation produces the digital signal.

In the present embodiment, the electronic apparatus operates similarly to that of the second embodiment when ball 50 of trackball device 50 is pressed, and trackball device 40 is mounted in a manner similar to that of the second embodiment, so that their descriptions are omitted.

According to the present embodiment described above, reed switches 71-74 are disposed as the second signal generators, so that each of their outputs can be obtained in the form of the digital signal. Thus, the electronic apparatus does not require an A/D conversion circuit for processing a signal and has simplified circuitry.

Exemplary Embodiment 4

The fourth exemplary embodiment of the present invention will be described hereinafter.

In an electronic apparatus of the present embodiment, a part where input device 11 is mounted differs in structure from that of the first embodiment, and the description deals mainly with this part, referring to the accompanying drawings.

Figure 11:
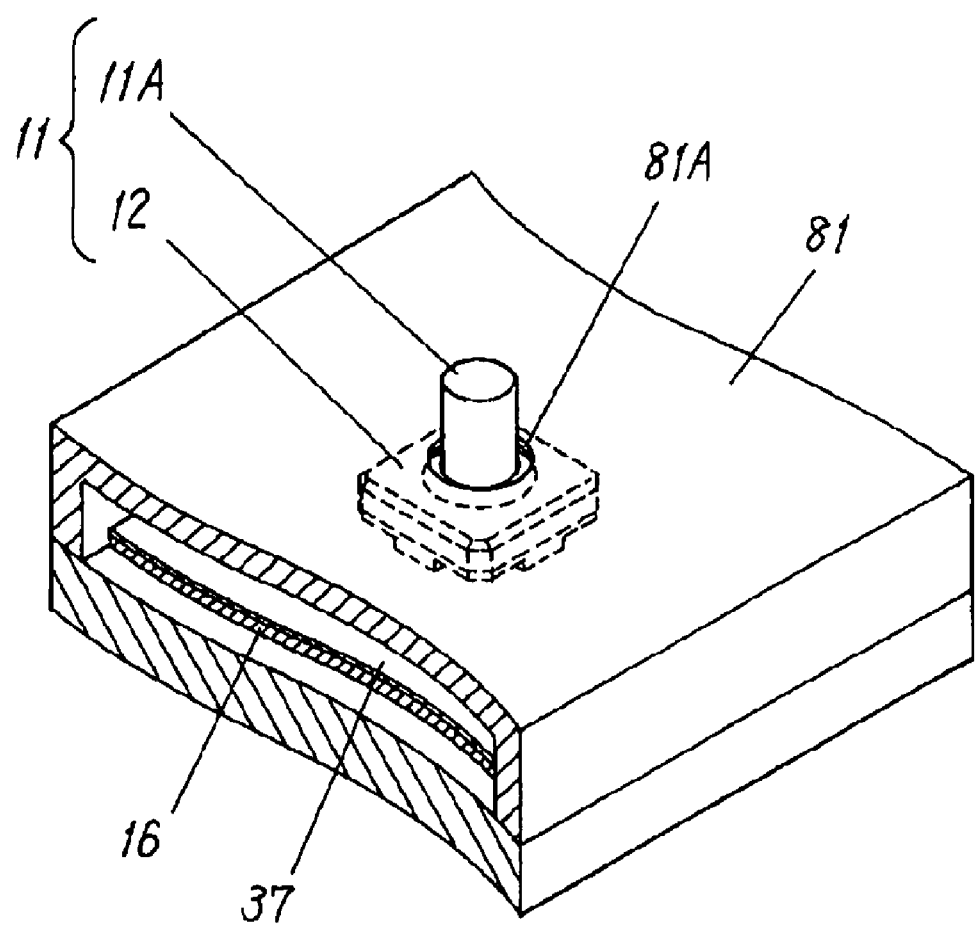
FIG. 11 is a perspective view of an essential part of an electronic apparatus in accordance with a fourth exemplary embodiment of the present invention.
Figure 12:
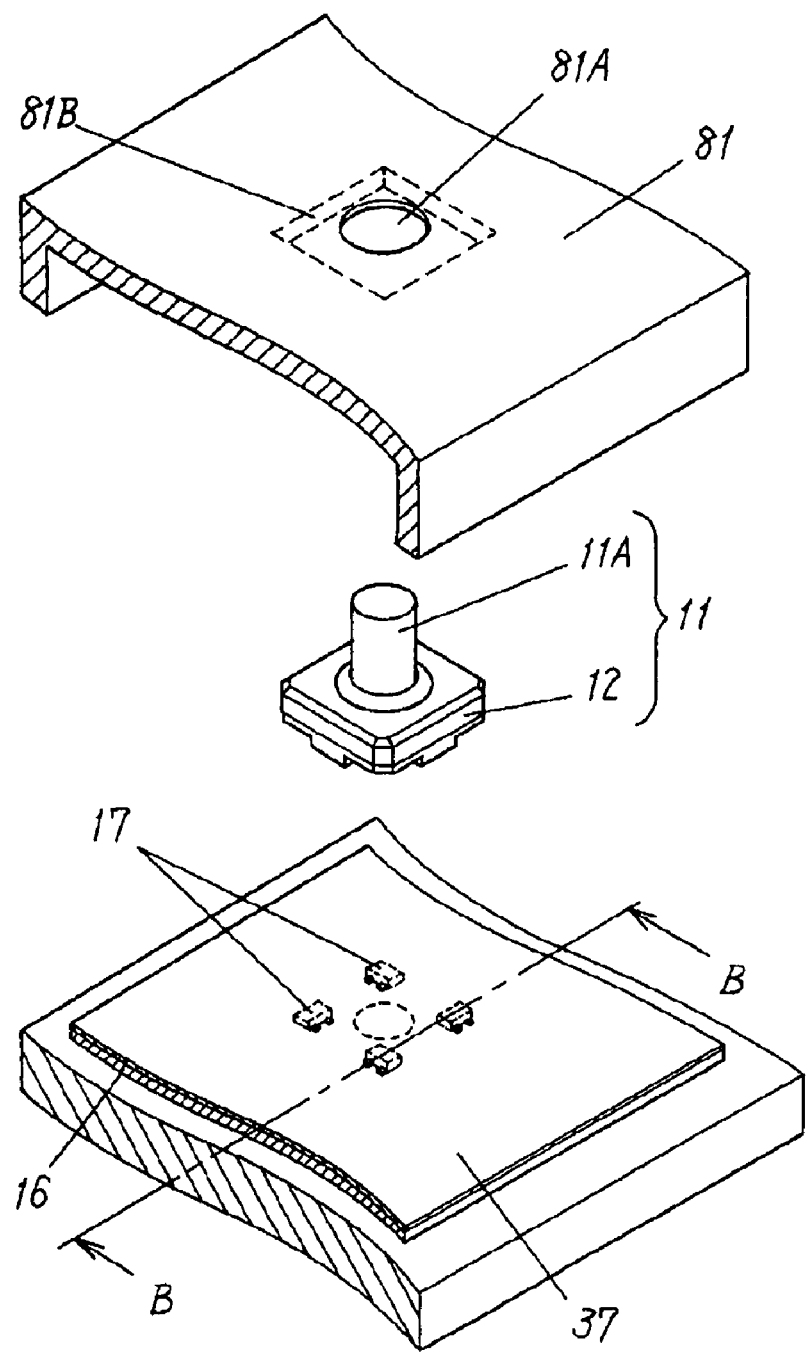
FIG. 12 is an exploded perspective view of the electronic apparatus of FIG. 11.
Figure 13:
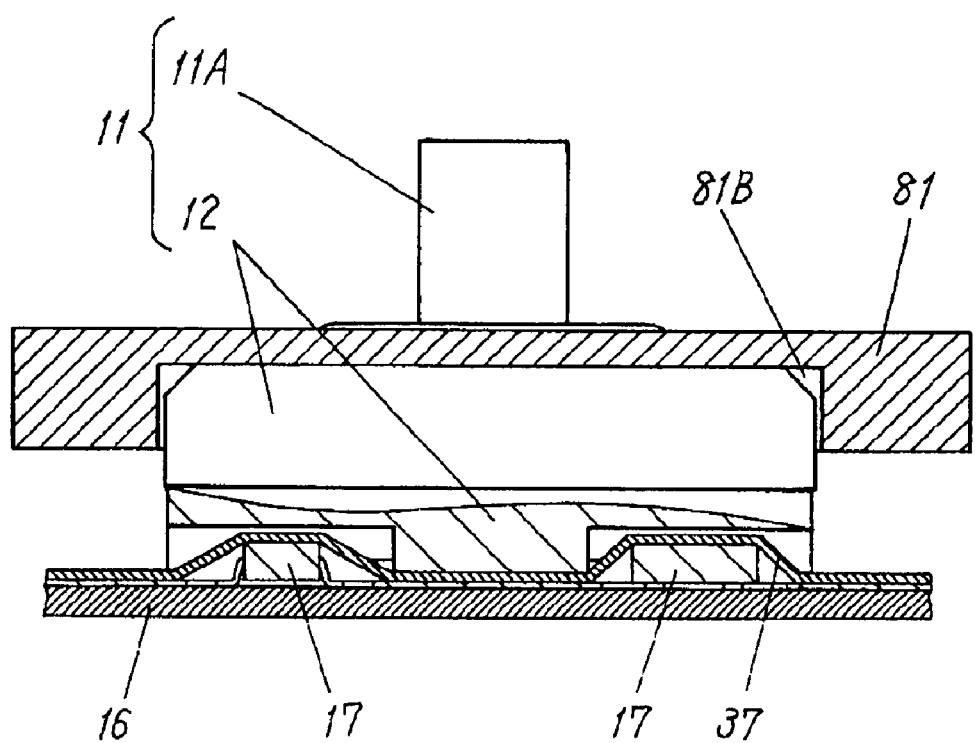
FIG. 13 is a sectional view taken along line B-B of FIG. 12, illustrating the electronic apparatus in complete condition.
Figure 14:
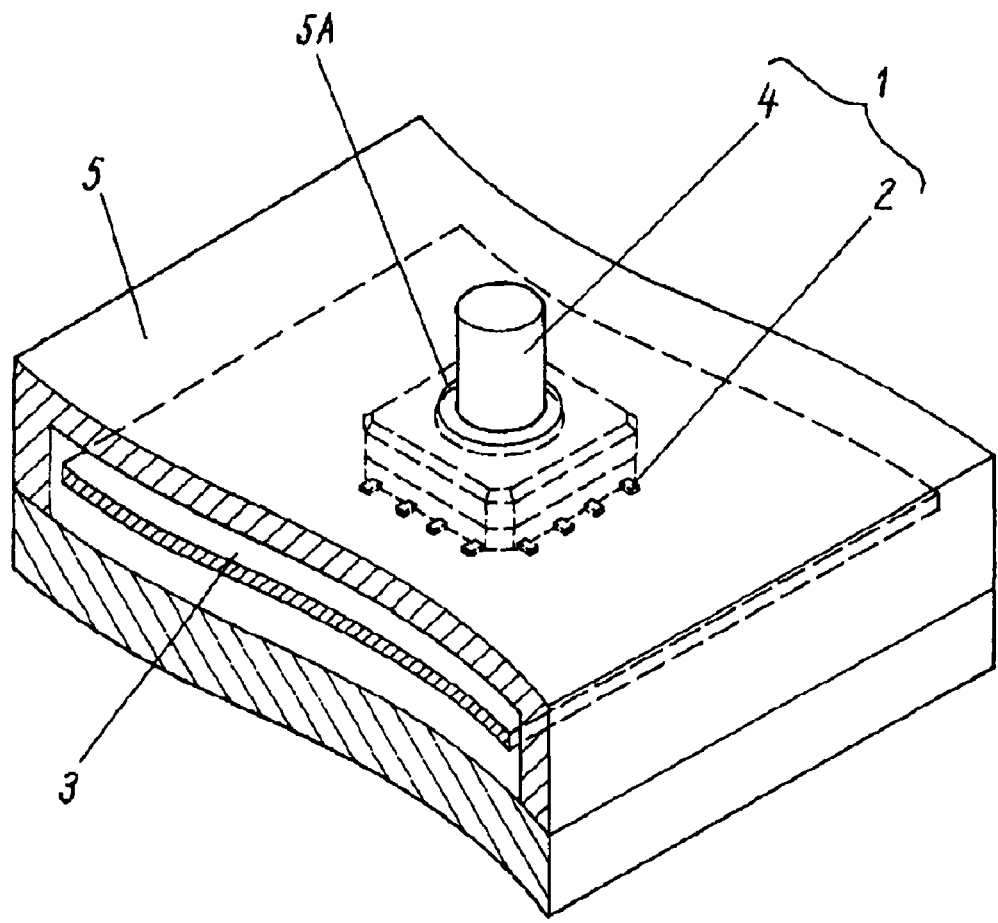
FIG. 14 is a perspective view of an essential part of a conventional electronic apparatus.

FIG. 11 is a perspective view of an essential part of the electronic apparatus in accordance with the fourth embodiment of the present invention, and FIG. 12 is an exploded perspective view of the same electronic apparatus. FIG. 13 is a sectional view taken along line B-B of FIG. 12, illustrating the electronic apparatus in complete condition.

As shown in these drawings, the electronic apparatus of the present embodiment utilizes housing 81 per se for positioning and mounting input device 11.

In other words, the structure of the present embodiment does not include cover 19 (see FIG. 1) such as described in the first embodiment. This allows the reduced number of parts.

As shown in FIGS. 11 and 12, housing 81 has opening 81A which is provided in place to correspond to operating member 11A of input device 11, and in the vicinity of opening 81A, locating recess 81B corresponding to the shape of an upper part of component case 12 of input device 11 is provided in a reverse side of housing 81.

Although elements such as other operating members are not shown in the drawings, housing 81 is provided with those elements on its side having opening 81A. In other words, the side of housing 81 that faces operating member 11A of input device 11 defines a main operating surface of the electronic apparatus.

On wiring board 16 disposed inside housing 81, second signal generators 17 are disposed in respective positions corresponding to opening 81A and recess 81B by soldering or the like.

Each one of second signal generators 17 produces a specified output signal by functioning in noncontact combination with each corresponding first signal generator (not shown) provided inside input device 11.

Although elements such as other electronic parts are not shown in the drawings, those elements are mounted on wiring board 16 with second signal generators 17, and those elements, second signal generators 17 and a top side of board 16 are collectively covered with insulating sheet 37.

Thus, wiring board 16 and those elements, such as second signal generators 17 and other electronic devices, which are mounted on board 16, can be protected without fail from dust or water entering from opening 81A of housing 81 or holes or slits, formed for other operating members in the side having opening 81A.

Input device 11 is positioned and mounted by being sandwiched between recess 81B of housing 81 and insulating sheet 37 covering wiring board 16 after its operating member 11A is inserted through opening 81A of housing 81. Since the upper part of component case 12 of input device 11 is inserted in recess 81B, case 12 and recess 81B engage sideways with each other, whereby input device 11 is positioned in a direction parallel to wiring board 16. Moreover, input device 11 is positioned vertically because a top surface of case 12 is pressed down by the reverse side of housing 81 at recess 81B, while a bottom surface of case 12 is supported by insulating sheet 37 over wiring board 16.

Rattle or the like produced by input device 11 can be reduced if soft insulting sheet 37 is used and pressed slightly along its thickness by the bottom surface of case 12 in installation. Input device 11 thus obtained is of high quality.

As mentioned above, the electronic apparatus of the present embodiment has the reduced number of elements, and the part of input device 11 that includes operating member 11A can be removed for replacement by just opening housing 81.

In the present embodiment, an operation and others of input device 11 are similar to those described in the first embodiment and will not be described.

In this embodiment, housing 81 has been utilized to hold input device 11 down. However, input device 11 may be positioned and mounted by use of another member.

Input device 11 using the first signal generators in noncontact condition for operation is not limited to a stick type input device such as described above. For example, the input device may be trackball device 40 such as described in the second embodiment, or may use a rolling member such as a ball or a roller as the operating member or a pad for specified input operation.

The present invention's structure for mounting the input device is also applicable to elements other than input device 11.

INDUSTRIAL APPLICABILITY

An electronic apparatus of the present invention that includes an input device has first signal generators disposed inside the input device, and second signal generators disposed in a housing, and these second signal generators function in combination with the first signal generators, respectively. The replacement of the input device is easy because it does not require removal of a wiring board disposed inside the housing, and the electronic apparatus is excellently maintainable and has excellent reliability.

The first and second signal generators operate in noncontact relation. This facilitates improvement of the apparatus's resistance to dust and water.

The use of a trackball device as the input device allows fine input operation such as selecting, deciding on or confirming a required operation. Since an output from each one of the second signal generators can be obtained in the form of a digital signal, the electronic apparatus can have simplified circuitry and is inexpensive and easy to use.

The invention claimed is:

1. A trackball apparatus comprising:
a magnetic sensor;
a case;
a ball provided inside said case;
four rollers, each of said rollers disposed orthogonal to each adjacent roller and each of said rollers facing said ball across a clearance; and
a magnet fixed to one end of each of said four rollers,
wherein said magnet rotates in accordance with rotation of one of said four rollers that contacts said ball, thereby changing magnetism when said ball is rolled, and said magnetic sensor detects the changing magnetism.

2. The trackball apparatus of claim 1, further comprising a wiring board, wherein said magnetic sensor is disposed on a position of the wiring board facing said magnet.

3. The trackball apparatus of claim 2, wherein said magnetic sensor and said wiring board are covered with an insulating sheet.

4. The trackball apparatus of claim 2, wherein said ball is operable to be vertically movable, and a switch which operates in relation to vertical movement of said ball is provided on said wiring board.

5. The trackball apparatus of claim 1, further comprising a resilient member disposed below said ball, wherein said ball is pressed against a circular hole of said case from inside said case by said resilient member.

6. The trackball apparatus of claim 5, wherein said resilient member includes a plate spring disposed in said case and said plate spring pushes up said ball from beneath.

7. The trackball apparatus of claim 2, further comprising a resilient member disposed below said ball, wherein said ball is pressed against a circular hole of said case from inside said case by said resilient member.

8. The trackball apparatus of claim 7, wherein said resilient member includes a plate spring disposed in said case and said plate spring pushes up said ball from beneath.

9. The trackball apparatus of claim 1, wherein each of said four rollers has a recessed and projected part at a part thereof which is operable to contact said ball.

* * * * *